Patented June 2, 1931

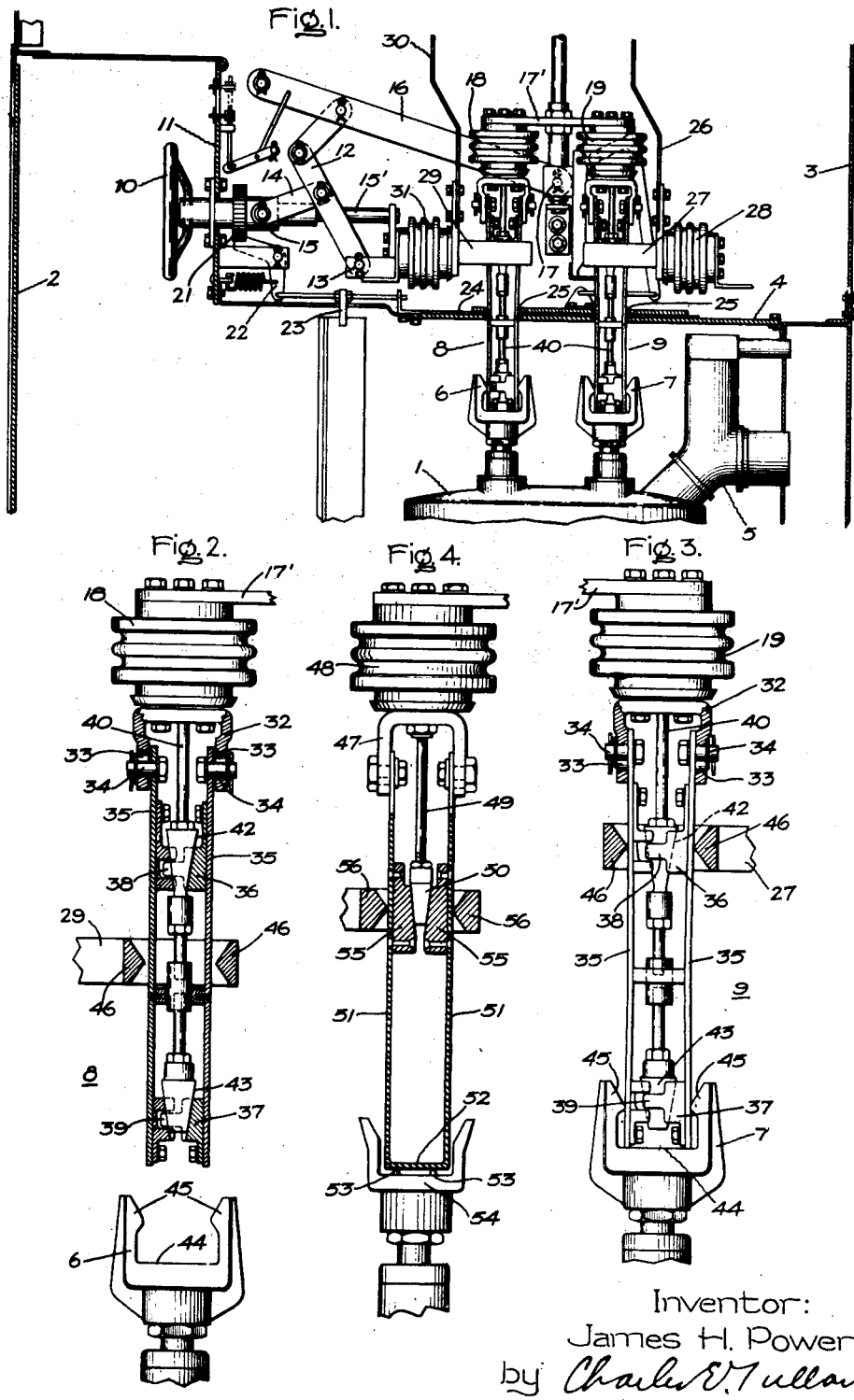

1,808,570

UNITED STATES PATENT OFFICE

JAMES H. POWERS, OF YEADON, PENNSYLVANIA, ASSIGNOR TO GENERAL ELECTRIC COMPANY, A CORPORATION OF NEW YORK

DISCONNECTING DEVICE

Application filed March 26, 1930. Serial No. 439,195.

My invention relates to a primary disconnecting device, and more particularly to such a device incorporated in cubicle type switchgear wherein the main switch unit remains stationary during the disconnecting or isolating operation.

In the elevated or draw-out type of switchgear wherein the movable switch unit has mounted thereon the movable primary disconnecting contacts, the disconnecting contact structure is usually of the plug-and-socket type having a comparatively high current carrying capacity, thereby avoiding flexible lead conductors. When, however, the main switch unit having disconnecting contacts is mounted, as within a cubicle, in a stationary position, the movable contacts of the disconnecting device must be provided with current conducting means movable with respect to the associated stationary bus bars. Flexible braided conductors, for example, have been employed for this purpose, but they are not suitable for the high current densities often required in this type of switchgear.

It is a principal object of my invention to provide an improved disconnecting device which shall be simple and rugged in construction, efficient in operation, and which shall insure high bearing pressure between the contacting surfaces of the device when in closed position for permitting high density of current flow without overheating.

My invention will be more fully set forth in the following description referring to the accompanying drawings, and the features of novelty which characterize my invention will be pointed out with particularity in the claims annexed to and forming a part of this specification.

Referring to the drawings, Fig. 1 is a fragmentary elevational view, partly in section, of cubicle type switchgear embodying my invention; Figs. 2 and 3 are views, partly in section, illustrating the disconnecting device in Fig. 1 in the open and closed positions respectively, and Fig. 4 is a view, partly in section, of another form of disconnecting device.

In Fig. 1 there is illustrated switchgear of the cubicle type wherein a main switch unit 1, as an oil circuit breaker, is mounted within a compartment of the cubicle comprising the front and rear walls 2 and 3, respectively, and the isolating partition 4. The circuit breaker which is provided with the usual gas venting means 5, is normally stationary within its compartment and is likewise provided with the stationary primary disconnecting contacts 6 and 7 connected to the respective conductor studs extending through the top of the breaker housing. Coacting with the contacts 6 and 7 are the movable disconnecting contacts 8 and 9 forming parallel plates or blades which are arranged to be biased in a manner hereinafter described, into engagement with the coacting contact faces of the contacts 6 and 7. In switchgear of this type, when the circuit breaker is to be removed from the cubicle for inspection or repair, the circuit breaker is first opened, after which the movable primary disconnecting contacts are moved out of engagement with the stationary contacts into the open or isolating position so that the breaker is then free to be removed from the cubicle by a truck or other suitable means.

For the purpose of raising and lowering the movable disconnecting contacts, there is provided suitable mechanism disposed above the partition 4 through which the movable contacts extend. In the present instance the operating mechanism comprises a handwheel 10 suitably journalled within a vertical section 11 forming part of the partition. The connections between the hand-wheel and the movable contacts comprise an operating toggle 12 having a fixed pivotal mounting 13 and an operative connection, through the link 14, with the collar 15, which is adapted to move axially along the shaft 15' of the hand-wheel upon rotation thereof. The toggle 12 is likewise connected to the operating lever 16 which carries at its outer end 17, as by the supporting member 17', a pair of insulators 18 and 19 having the movable disconnecting contacts 8 and 9 secured to and depending therefrom.

Since it is essential that the circuit breaker be opened prior to opening of the disconnecting device in order to prevent damage thereto by arcing, suitable interlocking means between the breaker mechanism and the hand-wheel 10 are provided. This interlocking mechanism forms no part of my present invention and may be in the form of a notched wheel 21 secured to the shaft 15' adapted to be locked in position by a latch 22 having an operative connection 23 with the circuit breaker mechanism. The interlocking mechanism is likewise preferably connected to shutter structure 24 comprising a flat plate mounted on the partition 4 and having apertures 25 adapted to be in registry with the apertures in the partition 4 through which the movable contacts extend. The operation of this type of isolating shutter mechanism is well known, it being sufficient to state that the shutter 24 is moved to close the contact openings through the partition when the movable disconnecting contacts have been withdrawn therethrough into their open or isolating position, so that the stationary and movable contacts are separated by the shutter, which is usually grounded.

When the circuit breaker and disconnecting device are in their closed circuit positions, as illustrated in Fig. 1, the circuit therethrough comprises the conductor 26 connected to bus bars or other apparatus (not shown) in the upper part of the cubicle, a fixed contact 27 secured to the insulator 28, which is mounted with respect to the cubicle, the movable contact 9, the stationary breaker contacts 7 and 6 connected to the oil breaker, the movable contact 8 and the fixed contact 29, which is connected to the other lead conductor 30 and mounted on the stationary insulator 31.

Referring more particularly to Figures 2 and 3, there are illustrated the open and closed positions of one of the movable contacts, as contact 8, the contacts being duplicates of each other. In Fig. 2, the hand-wheel 10 has been moved to straighten the toggle 12, thereby causing counter-clockwise movement of the operating link 16 to raise the movable contacts. The movable contact structure comprises a bracket 32 suitably secured to the insulator 18 at the lower end thereof and having depending sides provided with elongated slots 33 within which are mounted the contact supporting pins 34. Suitably secured to the pins are the parallel contact plates or blades 35 which are provided with cam portions 36 and 37 at those parts of the contact blades which engage the breaker contact 6 and the fixed contact 29 in the circuit closing position thereof. The camming portions form two individual parts mounted on the inner sides of the contact plates and are provided with staggered portions 38 and 39 for making a practically continuous structure while at the same time permitting relative movement between the parts. The camming portions are so shaped that there is a central opening therethrough, this opening preferably being in the form of an inverted cone, for a purpose presently described.

Likewise secured to the bracket 32 is a cam operating rod 40 extending between and longitudinally of the contact blades 35 and through the cone-like openings above referred to. The relation between the positions of the cams 42 and 43 and the slots 33 is such that the initial upward movement of the cam rod 40 before the pins engage in the lower portions of the slots, causes the said cams to be disengaged from their coacting camming portions.

In Fig. 3, the movable contact is illustrated in the closed circuit position wherein the cams 42 and 43 seat within their coacting camming portions, tending to bias the contact blades 35 away from each other and into firm contacting engagement with the stationary contact structure. In this position the contact blades when lowered by the insulator 18 into closed position, move by gravity substantially as illustrated in Fig. 2 until the lower ends of the contact blades engage the lower abutting surfaces 44 of the contact 6. In this position, the lower ends of the contact blades are adjacent the wedge-shaped contact portions 45 of the contact 6, and the upper parts of the blades are disposed between and adjacent the wedge-shaped portions 46 of the contact 29. Since the wedge-shaped portions are preferably provided with a comparatively sharp contacting edge to assure substantial line contact between the contacts, it will be apparent that an appreciable pressure between the plates tending to force them away from each other at the region of contact is effective to produce a comparatively high pressure per unit of contact area, thereby permitting high current densities.

In applying this pressure after the contacts are in their proper positions, the cam rod 40 continues to move with respect to the plates 35 by reason of the elongated slots 33 during the final closing movement. In other words, the bracket 32 having the cam rod 40 fixed thereto continues to move after the contact blades abut the contact surface 44 until the pins 34 engage the upper portions of the slots 33. This relative movement causes the cams 42 to force apart the blades 35 at their regions of contact, with the result that they engage in high pressure contacting relation their coacting contacting surfaces.

As previously mentioned, the opening movement of the disconnecting contacts causes the cam rod 40 to be actuated prior to the movement of the contact blades so that the high contact pressure is removed before the initial withdrawing movement of the contact blades. Accordingly, it will be apparent that engagement and disengagement of the contacts is easily effected and is not hindered by high contact pressure.

In Fig. 4 there is illustrated another form of primary disconnecting device, simpler in construction than the form previously described, and having but a single camming engagement with the contact blades. In this arrangement the supporting bracket 47 is mounted, as in the previous instance, on the lower end of the insulator 48 and has suitably fixed thereto the cam operating rod 49 for the conical cam 50. The contact blades 51 likewise have a lost-motion connection with the bracket 47 through pin and slot connections as previously described, and are integrally joined at their lower ends by a conducting portion 52 adapted to engage the stationary wedge-shaped contacting portions 53 of the contact 54. The cam 50 when in operative position, engages the inclined camming surfaces of the cam portions 55 to force the blades 51 apart into firm line contact engagement with the coacting fixed wedge contact portions 56. Due to the fact that the cam 50 when in operative position exerts a downward thrust, as well as an expansive force on the blades 51, the contact portion 52 will be biased into high pressure line contact engagement with the wedge portions 53.

The operation of the device illustrated in Fig. 4 is similar in other respects to the device illustrated in Figs. 2 and 3. In both instances application of the high pressure at the contacting line surfaces occurs only when the contact elements have been moved to their normally closed position, and this pressure is removed prior to application of the contact moving force so that opening and closing of the contacts may be effected by an operator with small expenditure of energy.

What I claim as new and desire to secure by Letters Patent of the United States is:

1. A disconnecting device comprising operating means, a movable contact adapted to be moved into closed and open circuit positions thereby, said movable contact having a lost-motion connection with said operating means, cam structure fixed with respect to said operating means, and a stationary contact for coacting with said movable contact, said operating means being movable through said lost-motion connection with respect to the movable contact for causing the cam structure to force the movable contact into firm contacting engagement with the fixed contact prior to opening and closing movement of the movable contact.

2. A disconnecting device comprising operating means, a movable contact adapted to be actuated to closed and open circuit positions by said means, stationary contact structure adapted to be engaged by opposite sides of the movable contact, said movable contact having a lost-motion connection with the operating means, and a cam rigidly mounted with respect to the operating means whereby continued movement of the operating means through said lost-motion connection after the movable contact is in closed circuit position cams the opposite sides of the movable contact into high pressure engagement with the stationary contact structure.

3. A primary disconnecting device comprising operating means, a movable contact actuated thereby, said movable contact comprising spaced parallel contact blades having a lost-motion connection with said operating means, cam structure disposed between said contact blades and movable with said operating means, and stationary contact structure adapted to be engaged by said contact blades, said stationary contact structure having wedge-shaped contacting surfaces whereby actuation of said cam structure through said lost-motion connection is effective to force said contact blades into high pressure line contact with the stationary contact structure.

4. A primary disconnecting device for high current densities comprising operating means, a movable contact actuated thereby, said movable contact comprising a pair of spaced contact blades having a lost-motion connection with the operating means, stationary contact structure having wedge-shaped contacting portions between which the contact blades are disposed in the closed circuit position, a cam disposed between the contact blades fixed with respect to and movable with the operating means, and coacting cam surfaces associated with the contact blades at their regions of contact with said wedge-shaped portions, said cam adapted to be moved by the operating means through said lost-motion connection to force the contact blades apart into high pressure line contact engagement with the wedge-shaped portions subsequent to movement of the contact blades to closed circuit position.

5. A primary disconnecting device comprising operating means, a movable contact actuated thereby, said movable contact comprising a pair of spaced contact blades having a lost-motion connection with the operating means, a pair of stationary contacts adapted to be connected by the movable contact, said stationary contacts each having wedge-shaped portions adapted to be engaged by the movable contact, and camming means disposed between said blades and movable with the operating means for urging the movable contact into high pressure engagement with the coacting wedge-shaped portions of said contacts subsequent to movement of the movable contact to its closed circuit position.

6. A primary disconnecting device comprising operative means, a movable contact having a lost-motion connection with and actuated by said means, said movable contact comprising a pair of spaced contact blades integrally connected at the lower portions thereof, a cam disposed between the contact blades and movable by said operating means independently of the movable contact through said lost-motion connection, and a pair of stationary contacts adapted to be connected by the movable contact, said stationary contacts having wedge-shaped contacting portions adapted to make line contact with the movable contact, the cam adapted to be actuated by the operating mechanism when the movable contact is in closed circuit position for forcing the contact blades at one portion thereof into high pressure engagement with the wedge-shaped portions of one stationary contact and to thrust the movable contact into high pressure engagement with the wedge-shaped portions of the other stationary contact.

7. In a cubicle comprising a stationary circuit breaker, primary disconnecting switch operating mechanism, and an isolating partition disposed between said circuit breaker and operating mechanism, movable disconnecting contacts adapted to be moved by said operating means through said partition and into engagement with coacting disconnecting contacts mounted on said breakers, said movable contacts each comprising a plurality of contact blades and a cam disposed between the same actuated by said operating means subsequent to movement of the movable contact to its closed position for forcing the blades into high pressure engagement with the coacting contact.

In witness whereof, I have hereunto set my hand this 24th day of March, 1930.

JAMES H. POWERS.